US005187204A

United States Patent [19]

Jackson et al.

[11] Patent Number: 5,187,204

[45] Date of Patent: Feb. 16, 1993

[54] ENERGY ABSORBING, WATER BLOWN, RIGID POLYURETHANE FOAM ARTICLES

[75] Inventors: Michael L. Jackson, Allen Park; Mark A. Easterle, Rochester, both of Mich.

[73] Assignee: BASF Corporation, Parsippany, N.J.

[21] Appl. No.: 634,643

[22] Filed: Dec. 27, 1990

[51] Int. Cl.[5] .......... C08J 9/12

[52] U.S. Cl. .......... 521/111; 264/51; 521/112; 521/174

[58] Field of Search .......... 264/51; 521/111, 112, 521/174

[56] References Cited

U.S. PATENT DOCUMENTS 4,883,825 11/1989 Westfall et al. .......... 521/174
4,970,243 11/1990 Jacobs et al. .......... 521/174

*Primary Examiner*—Morton Foelak
*Attorney, Agent, or Firm*—Martin P. Connaughton

[57] ABSTRACT

The invention relates to water blown, low density, energy absorbing rigid polyurethane foam articles which exhibit minimal springback or hysteresis characteristics. The articles produced from the foams of the present invention maintain a constant crush strength of material up to about 70% deflection and are useful in appropriate automotive applications such as side impact bolsters.

9 Claims, No Drawings

ENERGY ABSORBING, WATER BLOWN, RIGID POLYURETHANE FOAM ARTICLES

FIELD OF THE INVENTION

The invention relates to high energy impact applications of rigid polyurethane foams Specifically these are low density, predominantly open celled, water blown rigid polyurethane foam articles which exhibit minimal spring back or hysteresis characteristics. Such foamed articles are suitable as lightweight alternatives for traditional energy absorbing applications, such as side impact bolsters in automobile doors These foamed articles of the present invention exhibit properties comparable to energy absorbing foamed articles using chlorinated fluorocarbons as the blowing agent.

U.S. Pat. No. 4,866,102 describes moldable energy absorbing rigid polyurethane foam compositions which are prepared by the reaction of a graft polymer dispersion in a polyoxyalkylene polyether polyol with an alkylene oxide adduct of toluenediamine or diaminodiphenylmethane with an organic polyisocyanate in the presence of a crosslinking agent U.S. Pat. No. 4,722,946 describes the production of energy attenuating viscoelastic polyurethane elastomers and foams, comprising mixtures of linear and branched polyol intermediates, polyisocyanates, and optionally, extenders, blowing agents, and the like, in the presence of a catalyst whereby the isocyanate index is varied from about 65 to about 85. U.S. Pat. No. 4,644,563 describes a method of shoring a geological formation which comprises preparing a rigid polyurethane foams which exhibits nearly constant strain with increasing stress in compression. U.S. Pat. No. 4,696,954 describes the preparation of molded polyurethane foams characterized by high impact strength and good thermal stability. U.S. Pat. No. 4,614,754 describes a high density rigid polyurethane foam which exhibits nearly constant strain with increasing stress in compression. U.S. Pat. No. 4,585,807 describes rigid polyurethane foams employing oxyalkylated ethylenediamine.

SUMMARY OF THE INVENTION

The present invention applies to high energy impact applications of low density, predominantly open celled, energy absorbing, rigid polyurethane foams free of chlorinated fluorocarbon blowing agents yet exhibiting comparable critical physical characteristics, e.g. the crush strength of the material remaining constant up to about 80 percent deflection, and having minimal spring-back or hysteresis.

DETAILED DESCRIPTION OF THE INVENTION

Under ever increasing governmental regulations addressing both personal safety and environmental concerns auto manufacturers have been put in a position where they must meet stringent impact requirements, maintain vehicle weight and reduce the use of materials having a detrimental effect on the environment. Energy absorbing rigid polyurethane foams have provided a partial solution in some impact performance requirements areas; e.g. energy absorbing fillers which can be used to stiffen door support frames, thus aiding in preserving the structural integrity of the passenger compartment of an automobile or as bolsters which can reduce effects of secondary collision (occupant-to-interior). However, the foams exhibiting the desired impact characteristics utilize chlorinated fluorocarbons as the foaming agent. That fact alone reduces their desirability in light of mandates to reduce and eventually eliminate the use of CFC's.

In the instant invention it has been found that certain water blown rigid polyurethane foams can be produced which exhibit energy absorbing characteristics comparable to the CFC blown rigid polyurethane foams. These foams may be employed in energy absorbing applications, such as side impact bolsters in automobiles.

These foams are predominantly open celled; have a density of from about 2.0 pcf to about 3.0 pcf, preferably 2.3 to 2.8 pcf and the crush strength remains constant from about 10% to about 70% deflection in loads of up to about 50 psi, preferably at or about loads of 22 psi$\pm$2 psi. In general the criteria for good energy absorbing foam is a value less than 28 psi at 50 percent deflection and less than 34 psi at 70 percent deflection.

The foams used in the present invention comprise the reaction product of:

A) a $C_2$–$C_4$ alkylene oxide adduct of propylene glycol or ethylene diamine or mixtures thereof;

B) an isocyanate in which all the isocyanate groups are aromatically bound;

C) a catalyst or mixture of catalysts;

D) water;

E) a surfactant;

F) optionally a chain extender; and

G) optionally pigments, a flame retardant, fillers, or other additives known to those skilled in the art.

Alkylene oxide adducts of initiators other than propylene glycol and ethylene diamine may be included in minor amounts in the above formulation. Suitable alkylene oxide adducts are polyether polyols having a functionality of at least two. These polyether polyols are produced in accordance with well known methods by reacting one or more alkylene oxides with 2 to 4 carbon atoms in the alkylene radical with initiator molecules containing from 2 to 8 reactive hydrogen atoms. Suitable alkylene oxides include ethylene oxide, propylene oxide, and butylene oxide, preferably propylene oxide. Initiator molecules are ethylene glycol, diethylene glycol, propylene glycol, dipropylene glycol, trimethylene glycol, 1,2-butane diol, 1,3-butane diol, 1,4-butane diol, 1,2-pentane diol, 1,4-pentane diol, 1,5-pentane diol, 1,6-hexane diol, 1,7-heptane diol, glycerol, 1,1,1-trimethyol propane, 1,1,1-trimethyol ethane, 1,2,6-hexane triol, o-methyl glucoside, pentaerythritol, sorbitol, and sucrose. Other initiator molecules include amines such as trialkanolamine, triethanolamine, triisopropanolamine, aliphatic, cycloaliphatic and aromatic diamines with 2 to 15 carbon atoms such as ethylene diamine, 1,3-propanediamine, propylene diamine, 1,4-butanediamine, 1,6-hexamethylenediamine, 1,4-diaminocyclohexane, 4,4'-2,4'- and 2,2'-diaminodiphenylmethane.

Suitable isocyanates include those in which the aromatic groups are aromatically bound. Representatives of these types of isocyanates includes, 2,4-toluene diisocyanate, 2,6-toluene diisocyanate, mixtures of 2,4- and 2,6-toluene diisocyanate, naphthalene-1,5-diisocyanate, 1-methoxyphenyl-2,4diisocyanate, 4,4'-diphenylmethane diisocyanate (MDI), 2,4'-diphenylmethane diisocyanate (MDI), mixtures of 4,4'- and 2,4-diphenylmethane diisocyanate, 4,4'-biphenyl diisocyanate, 3,3'-dimethyl-4,4'-biphenyl diisocyanate, 3,3'-dimethyl-4,4'-biphenyl diisocyanate and 3,3'-dimethyldiphenyl methane-4,4'-diisocyanate; and polymeric polyisocyanates such as polymethylene polyphenylenes polyisocyanates (polymeric MDI). Included within the useable isocyanates are those modifications containing carbodiimide, allophonate, urethane or isocyanurate structures. Unmodified polymeric MDI and mixtures of polymeric MDI and pure 2,4 and 4,4' MDI are preferred. These polyisocyanates are prepared by conventional methods known in the art, e.g. phosgenation of the corresponding organic amine.

Any suitable catalyst or mixture of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin-di-2-ethyl hexonate, potassium hexanoate, stannous oxide, as well as other organometallic compounds such as are disclosed in U.S. Pat. No. 2,846,408.

Chain extending agents which may be employed in the preparation of the polyurethane foams include those compounds having at least two functional groups bearing active hydrogen atoms such as, hydrazine, primary and secondary diamines, amino alcohols, amine acids, hydroxy acids, glycols, or mixtures thereof. A preferred chain extender when used is glycerin.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred Of these, the nonionic surface-active agents such as the well-known silicones have been found particularly desirable. Other surface-active agents which are operative, although not preferred, include polyethylene glycol ethers of long chain alcohols, tertiary amine or alkanol amine salts of long chain alkyl acid sulfate esters, alkyl sulfonic esters, and alkyl arylsulfonic acids.

Other optional additives which fall within the spirit of the present invention include known pigments, such as carbon black, dyes, stabilizers against aging and weathering, fungistats, bacteriostats, fillers, or flame retarding agents.

If desired, flame retardants may be incorporated in the foams. Among the flame retardants which may be employed are: pentabromodiphenyl oxide, dibromopropanol, tris(β-chloropropyl)phosphate, 2,2-bis(bromoethyl) 1,3-propanediol, tetrakis(2-chloroethyl)ethylene diphosphate, tris(2,3-dibromopropyl)phosphate, tris(β-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane.

The following illustrate the nature of the invention. All parts are by weight unless otherwise indicated.

Examples 1 through 4 were prepared using the following conditions:

| Processing Conditions | |
|---|---|
| Machine | High Pressure |
| Component Temp | |
| Resin °F. | 77 |
| Isocyanate °F. | 77 |
| Mixing Pressure | |
| Resin (bar) | 180 |
| Isocyanate (bar) | 180 |
| Throughput g/sec | 175 |
| Mold Temperature °F. | 100 ± 5 |
| Mold Release | Silicone |
| Processing Mode | Open Mold Pour |
| Demold Time min | 3 |

| Part Characteristic | |
|---|---|
| Density *pcf* | 2.3–2.8 |

The formulations as indicated were injected into the center of a preheated shoulder bolster mold. The mold was closed and the part demolded in approximately 3 minutes. The parts were cured at 50% humidity and 73° F prior to testing. Foam compression testing (ASTM D-1621) at 10 percent intervals was carried out to determine foam performance characteristics. Examples 1 and 2 are water blown foams of the present invention. Example 3 is a currently used energy absorbing foam composition using F-11a (a chlorinated fluorocarbon). Example 4 is a formulation comparable to Example 3 with water substituted for F-11a. Although these parts were made using an open mold pour technique, the system is equally amenable to other fabrication methods known to those skilled in the art, e.g. RIM (reaction injection molding).

Description of Components

Polyol A was a propylene oxide adduct of propylene glycol having a molecular weight of about 335 and a hydroxyl number of about 107.

Polyol B was a propylene oxide adduct of propylene glycol having a molecular weight of about 431 and a hydroxyl number of about 260.

Polyol C was a propylene oxide adduct of ethylene diamine having a molecular weight of about 293 and a hydroxyl number of 767.

Polyol D was a propylene oxide adduct of a mixture of toluene diamine isomers containing predominantly vicinal isomers, having a molecular weight of about 570 and a hydroxyl number of about 390.

Polyol E was a propylene oxide adduct of propylene glycol containing 50 percent of 2:1 acrylonitrile/styrene having a hydroxyl number of about 69.

Iso A was a polymeric polymethylene polyphenylisocyanate having a functionality of about 2.7.

Iso B was a 50:50 mixture of 2,4- and 4,4'-pure diphenyl methane diisocyanate having a functionality of two.

NIAX A-1 was an amine catalyst sold by Union Carbide.

NIAX L-550 was a silicone surfactant sold by Union Carbide.

NIAX L-540 was a silicone surfactant sold by Union Carbide.

NIAX C-174 was an amine catalyst sold by Union Carbide.

DCX2-5384 was a silicone surfactant sold by Dow Corning.

Tegostab B-4113 was a silicone surfactant sold by Goldschmidt.

DABCO R-8020 was an amine catalyst sold by Air Products.

DABCO 33 LV was an amine catalyst sold by Air Products.

DABCO SA-102 was an amine catalyst sold by Air Products

DABCO BL-17 was an amine catalyst sold by Air Products.

HexChem 977 was an organo metallic catalyst.

UL-1 was a tin catalyst sold by Fomrez Corporation.

Polycat 8 was an amine catalyst sold by Air Products

F11A was a chlorinated fluorocarbon sold by DuPont Corporation.

TABLE I

| | 1 | 2 | 3 | 4 |
|---|---|---|---|---|
| Resin Component | | | | |
| Polyol A | 40.0 | — | — | — |
| Polyol B | 38.5 | — | — | — |
| Polyol C | — | 66.9 | — | — |
| Polyol D | — | — | 35.0 | 35.0 |
| Polyol E | — | — | 50.0 | 50.0 |
| NIAX A1 | — | 0.2 | — | — |
| NIAX L-550 | 1.5 | — | 0.8 | — |
| NIAX L-540 | — | — | — | 1.5 |
| NIAX C-174 | — | — | — | 2.5 |
| DC X2-5384 | — | 0.5 | — | — |
| Tegostab B-4113 | — | 0.4 | — | — |
| DABCO R-8020 | — | — | 1.5 | — |
| DABCO 33LV | 2.0 | — | — | 0.5 |
| DABCO SA-102 | — | 0.5 | — | — |
| DABCO BL-17 | — | 1.0 | — | — |
| HexChem 977 | 7.0 | 0.5 | — | — |
| FOMREZ UL-1 | — | — | 0.03 | — |
| Polycat 8 | 1.0 | — | — | — |
| Glycerin | — | 15.0 | 15.0 | 15.0 |
| Water | 10.0 | 15.0 | — | 15.0 |
| F-11A | — | — | 60.0 | — |
| Isocyanate Component | | | | |
| Iso A | 218.3 | 200.0 | 89.3 | 119.5 |
| Iso B | 24.2 | — | — | — |

TABLE II

| Sample | Strength at Yield | Strength at 10% Deflection | Strength at 20% Deflection | Strength at 30% Deflection | Strength at 40% Deflection | Strength at 50% Deflection | Strength at 60% Deflection | Strength at 70% Deflection | Strength at 80% Deflection |
|---|---|---|---|---|---|---|---|---|---|
| 1 | 17.18 | 22.14 | 22.48 | 22.26 | 22.30 | 22.86 | 23.98 | 27.61 | 45.87 |
| 2 | 12.77 | 15.15 | 17.21 | 20.53 | 21.67 | 22.32 | 23.78 | 29.90 | 57.16 |
| 3 | 17.84 | 16.57 | 15.10 | 15.70 | 16.34 | 17.37 | 19.18 | 26.92 | 85.59 |
| 4 | — | 37.46 | 39.80 | 42.40 | 45.77 | 51.40 | 61.77 | 80+ | 100+ |

all measurements are in psi
all measurements are averages of multiple tests on each sample.

Table II shows the results of ASTM D-1621 foam compression tests for each sample. As is evident from the data, merely substituting water (Ex. 4) for CFC's (Ex. 3) in a formulation produces a foam which is too hard and shows a significant loss in efficiency, i.e. consistency of compressive strength over deflection. Whereas examples 1 and 2 exhibit efficiency comparable to the CFC blown foam in the desired range of hardness.

The embodiments of the invention in which exclusive privilege or property is claimed are as follows:

1. A method of forming an energy absorbing foamed article, comprising;

A) reacting in a closed, preheated, prepared mold, a formulation capable of producing a predominantly open-celled energy absorbing foam, comprising;

i) a $C_2$-$C_4$ alkylene oxide adduct of an initiator selected from a group consisting of propylene glycol, ethylenediamine, or mixtures thereof, ii) an isocyanate in which all the isocyanate groups are aromatically bound, iii) a catalyst, iv) a blowing agent consisting essentially of water, v) a surfactant, and vi) optionally a chain extender, B) demolding and curing said article, wherein the cured foamed article has a density of from about 2.0 pcf to about 3.0 pcf, and has a constant crush strength from about 10 percent to about 70 percent deflection at loads less than 50 psi.

2. A method as claimed in claim 1, wherein the alkylene oxide adduct is a mixture of propylene oxide adducts of propylene glycol having molecular weights from about 330 to about 430.

3. A method as claimed in claim 1, wherein the alkylene oxide adduct is a propylene oxide adduct of ethylene diamine having a molecular weight of about 300.

4. A method as claimed in claim 1, wherein the isocyanate is selected from the group consisting of polymeric polymethylene polyphenylisocyanate, a 50:50 mixture of 2,4- and 4,4'-diphenylmethane diisocyanate, and mixtures thereof.

5. A method as claimed in claim 1, wherein the surfactant is a silicone surfactant.

6. A method as claimed in claim 1 wherein the optional chain extender is glycerin.

7. A method as claimed in claim 1 wherein the density is from about 2.3 pcf to about 2.8 pcf.

8. A method as claimed in claim 1, wherein the crush strength remains constant from about 10 percent to about 70 percent deflection at loads of about 24 psi.

9. A method of forming an energy absorbing foam shoulder bolster, wherein the bolster has a density of from about 2.3 pcf to about 2.8 pcf and has a constant crush strength from about 10 percent to about 70 percent deflection at loads from about 17 psi to about 30 psi, comprising;

A) reacting in a closed, preheated, prepared mold, a formulation capable of producing a predominantly open-celled energy absorbing foam, comprising;

i) a propylene oxide adduct of propylene glycol, ethylenediamine, or mixtures thereof, ii) an isocyanate selected from the group comprising polymeric polymethylene polyphenylisocyanate, a 50:50 mixture of 2,4- and 4,4'- diphenylmethane diisocyanate, and mixtures thereof, iii) a catalyst, iv) a blowing agent consisting essentially of water, v) a silicone surfactant, and vi) optionally glycerin as a chain extender.

* * * * *